United States Patent [19]

Becker et al.

[11] 3,948,828

[45] Apr. 6, 1976

[54] LIQUID TO PASTY DYESTUFF PREPARATIONS

[75] Inventors: Carl Becker, Basel; Jacques Wegmann, Bettingen, both of Switzerland

[73] Assignee: Ciba-Geigy Corporation, Ardsley, N.Y.

[22] Filed: Apr. 8, 1974

[21] Appl. No.: 458,925

[30] Foreign Application Priority Data

Apr. 13, 1973 Switzerland.......................... 5337/73

[52] U.S. Cl................ 260/13; 260/17 R; 260/37 N; 260/16; 260/24; 260/26; 428/407
[51] Int. Cl.²............................................ C08L 1/26
[58] Field of Search............ 106/189, 193 D, 193 I, 106/308 Q, 26, 193, 197; 8/63; 260/13, 37 N, 16, 24, 26; 117/100 C; 428/407; 427/212, 197

[56] References Cited
UNITED STATES PATENTS

| | | | |
|---|---|---|---|
| 2,285,178 | 6/1942 | Thinius | 260/13 |
| 2,649,382 | 8/1953 | Vesce | 106/193 J |
| 2,761,789 | 9/1956 | Locher | 106/193 D |
| 2,923,593 | 2/1960 | Olpin | 8/63 |
| 3,011,904 | 12/1961 | Ballentine | 117/100 C |

FOREIGN PATENTS OR APPLICATIONS 1,025,694  4/1966  United Kingdom................ 427/212

OTHER PUBLICATIONS

Harrington, Def. Pub. of Ser. No. 432,018, filed Jan. 9, 1974, published in 925 O. G. 10, on Aug. 6, 1974.

*Primary Examiner*—Theodore Morris
*Attorney, Agent, or Firm*—Joseph G. Kolodny; Edward McC. Roberts; Prabodn I. Almaula

[57] ABSTRACT

Liquid to pasty dyestuff preparations are described consisting of at least 35 % of an optionally hydrous solvent from the class of alcohols, esters, ethers or ketones having a boiling point of above 90°C, at least 10 % and at most 40 % of a dyestuff or optical brightener and at least 5 % and at most 25 % of a partially or fully synthetic thermostable synthetic resin present in the dissolved form. These preparations are useful for the coating of compounds of thermoplastic high polymers in the form of granulates or in the form of flakes or powders, particularly those made from polyester, polyamide and polypropylene.

11 Claims, No Drawings

LIQUID TO PASTY DYESTUFF PREPARATIONS

The invention relates to new, liquid to pasty dyestuff preparations, to the use thereof for the coating of thermoplastic synthetic compounds, preferably those made from polyester, polyamides or polypropylene, as well as to the synthetic compounds coated with these preparations.

It is known from the Belgian Patent Specification No. 759,779 that it is possible to coat granulates of thermoplastic resins, such as polymers of the polyamide and polyester type, with water-insoluble dyestuffs, pigments or optical brighteners, in the dissolved or finely dispersed form, from organic solvents which are miscible with water to a limited extent and which form a settled two-phase system; and, after removal of the solvents, to subsequently form them into coloured objects. It is also known from the said specification that, with application of dyestuffs, or pigments which dissolve only slowly or not at all in the melt of the polymer to be moulded, it is possible by addition of carrier polymers which are insoluble in the organic solvent under coating conditions and which are thermostable, and compatible with the polymers to be moulded, to obtain, after shaping of the coated granulates, objects, particularly fibres, which display an excellent homogeneous fine dispersion of the dyestuff or of the pigment. The substance used as the carrier polymer insoluble in the organic solvent can be the same as that to be moulded subsequent to coating; it is, for example, powder from polyester, polyamides or polyolefins. It is preferable to choose derivatives that are somewhat less high-polymeric and lower melting, in order to attain on moulding a rapid mixing throughout and hence a better distribution. If optimum results are to be obtained, it is therefore essential that the dyestuff be dispersed to the highest possible degree by dissolving and reprecipitation or by grinding, and intimately mixed with the carrier polymer. Such preparations, however, have the disadvantage, especially if the pigment is only ground and not dissolved and reprecipitated, that coatings are obtained which, with regard to resistance to abrasion, particularly after drying, cannot in all cases fully satisfy the high requirements of pneumatic conveyance.

It has now been found that also synthetic resins which are present in the dissolved form in the organic solvent being used for coating, and which are thermostable, are suitable as carrier polymers and have the advantage not only that they ensure an excellent fine dispersion of the dyestuff in the preparation but also that, in addition, they lead to an appreciably improved adhesion of the coating in the wet state during the coating operation and, in particular, also in the dry state during subsequent transportation and processing.

The liquid to pasty dyestuff preparations according to the invention consist of:

a. at least 35% and particularly 50 to 70%, relative to the total preparation, of an optionally hydrous solvent from the class of alcohols, esters, ethers or ketones, having a boiling point of over 90°C, especially over 150°C, a flash point of over 20°C, particularly over 40°C, and a water-solubility of 1 to 35%;

b. at least 10% and at most 40%, especially 15 to 25%, relative to the total preparation, of a dyestuff or optical brightener, in the dissolved or finely ground form, which contains no dispersing agents, is difficultly soluble to insoluble in water, and has a particle size preferably of below 5 $\mu$, especially of below 1 $\mu$; and c. at least 5% and at most 25%, especially, 15 to 25%, relative to the total preparation, of a partially or fully synthetic, thermostable synthetic resin present in the dissolved form.

The preparations can moreover contain further insoluble constituents such as, for example, solvent-insoluble synthetic resins, polypropylene, or metal salts of high-molecular acids, such as abietic acid or behenic acid, also agents protecting against light rays, UV-absorbers, stabilisers and delustring agents.

The employed dyestuffs must, as defined, be difficultly soluble or insoluble in water, and contain no water-soluble dispersing agents and diluting agents, since these could interfere with or prevent the formation of the two-phase system necessary for the application. In order to permit of an economical application, they must be present therefore in the highest possible concentration, with 10% being the lower limit. The preparations cannot contain more than 40% of dyestuff, as otherwise they would be too highly viscous, and could no longer be fully satisfactorily dispersed.

In order to ensure obtainment of stable preparations free from settling and stable in storage, the dyestuffs must be in the dissolved or finely ground form. Intermediate forms in which the dyestuffs are half dissolved or half dispersed are to be avoided, since they unfavourably affect the reversibility of the preparations. The choice of the solvent has to be such that either a solution or a dispersion results. For the application of dissolved dyestuff to be possible, high requirements have to be met regarding solubility, which must be at least 10% at room temperature. Particularly suitable in this case are the so-called solvent dyes. By these are meant, for instance, the salts of high-molecular amines, such as, for example, bicyclohexylamine or Amine D, an amino derivative of abietic acid, with acid dyestuffs from the group of azo, anthraquinone any phthalocyanine derivatives, as well as of anionic 1:2 metal-complex dyestuffs from the group of azo and formazan derivatives, which possess, besides the necessary solubility, the required thermostability and fastness.

Preferably used are disperse dyestuffs and, as insoluble dyestuffs, pigments which are insoluble in the solvent, since they have superior fastness and render possible a wider range of application.

The dyestuffs concerned therefore are, for example, disperse dyestuffs free from diluting agents, which, with regard to constitution, can belong to the most varied chemical classes, such as, e.g. the class of azo dyestuffs, azomethine dyestuffs, stilbene dyestuffs, nitro dyestuffs, naphthoquinone dyestuffs, quinophthalone dyestuffs, anthraquinone dyestuffs, diazine dyestuffs and acridone dyestuffs. Also suitable are vat dyestuffs, free from diluting agents, of the type belonging to the indigoid, thioindigoid and anthraquinoid series. Most of these are insoluble in the solvent, but dissolve in the melt of the high polymer to be moulded, particularly in polyamide and polyester resins, not, however, in polyolefins.

Suitable dyestuffs insoluble in water are pigments, both inorganic and organic pigments. Inorganic pigments that may be mentioned are the natural pigments such as carbon black, ochre, umber, green earth and Terra di Siena; then chrome yellow, red lead, iron oxide pigment, cadmium pigment and cobalt blue. To be mentioned as organic pigments are natural pigments such as sepia and indigo; particularly, however, synthetic pigment dyestuffs, such as those from the class of azo, anthraquinone, phthalocyanine, nitro, perinone, perylenetetracarboxylic acid diimide, dioxazine, thioindigo, diisoindolinone and quinacridone dyestuffs, and also metal-complex dyestuffs having pigment character.

Optical brighteners which likewise may be present in these preparations, and which must be insoluble in water, can belong to the various known classes. They are, in particular, derivatives of diaminostilbene-disulphonic acid, benzidine, benzimidazole, diimidazole, diphenylimidazolone, phenylbenzothiazole, derivatives of 4-aminonaphthalene-1,8-dicarboxylic acid amide, substituted methylcoumarins and oxazole, oxacyanine and 1,3-diphenylpyrazoline derivatives.

The partially synthetic and fully synthetic resins to be used with the dyestuffs have a whole series of functions. They have in paricular to stabilise the dispersion of the dyestuffs and should not give rise to flaking; they must produce a quantitative coating that rubs off neither in the wet state nor in the dry state; they must give up the solvent rapidly and completely to the water, and not become adhesive; they must be compatible with the plastics to be moulded, and be thermostable; and they must moreover be of such a nature that under the moulding conditions a dispersion of the dyestuff in the polymer at least equal to that in the pasty preparation is ensured. They must therefore have good solubility in the solvent at room temperature, but must not cause too great an increase in viscosity, so that high dyestuff concentrations are possible. And, finally, they must be in the dissolved form.

Among the synthetic resins which are able to satisfy these various conditions are low molecular polyamides, polyesters and polyester amides, hydrocarbon resins such as highly aromatic polyindene resins, polymeric olefins having methylated paraffin chains, alkylaromatic resins, aromatic copolymers, cyclic polymers, lower-molecular vinyl aromatic substances and polyterpenes such as those obtainable commercially, for example, under the trade name of Escorez (Esso).

Also applicable are: polyterpenes, polystyrene, polyacrylic compounds and their copolymers; particularly, however, cellulose esters and cellulose ethers, as well as colophonium resins in the form of hydrogenated, polymerised or copolymerised esters, and other derivatives.

Of special importance are the esters of hydrogenated colophonium, ethylcellulose and ethylhydroxyethyl cellulose, as well as mixtures of these resins.

Organic solvents which are present corresponding to component (a) in the preparations should have only a limited solubility in water, preferably one of about 10 to 350 g/l, and a boiling point of over 90°C, preferably of over 150°C, as well as a flash point of over 20°C, preferably of over 40°C. Mentioned as organic solvents possessing these properties are: esters such as ethyl glycol acetate, alcohols such as sec. butanol, benzyl alcohol and cyclohexanol; ethers such as hexyl glycol and phenyl glycol, particularly, however, ketones such as cyclohexanone and 4-methoxy-4-methylpentanone-2.

It can be of advantage if these solvents are hydrous or are saturated with water, i.e. are used in the form in which they are obtained on regeneration.

Preferred preparations are those in which component (b) is an inorganic or organic pigment, particularly carbon black or phthalocyanine, component (c) a cellulose ether and/or an abietic acid derivative, especially a mixture of ethylcellulose and hydrogenated abietic acid ester, and component (a) hydrous, optionally saturated cyclohexanone, pentoxone or cellosolve acetate, and the mixture of (b) and (c) is present to the extent of 40% in the total preparation, whereby components (b) and (c) are present in this mixture in equal proportions.

These liquid to pasty preparations are prepared by known relevant methods; for example, by a process in which the components, i.e. the water-insoluble dyestuff, the pigment or optical brightener, the modified natural resin or the synthetic resin and the organic solvent as defined, are mixed together and preferably ground to obtain a finely divided mixture, the particle size of which is below 5 $\mu$ (microns), preferably below 1 $\mu$, by virtue of which the resulting dyestuff preparations are physically very homogeneous.

These dyestuff preparations are used, in particular, for the coating of synthetic compounds of thermoplastic high polymers such as those made from polyamide, polyester or polyolefins, such as polypropylene, preferably from a two-phase system, with subsequent moulding or spinning of these dyed synthetic compounds from the melt.

These thermoplastic compounds can be in the form of, in particular, granulates, or they can be in the form of flakes or powder.

Compared with the preparations of similar composition known from the initially mentioned Belgian Patent Spec. No. 759,779, the preparations according to the invention have advantages, such as: improved abrasion resistance of the coating; no rubbing off during pneumatic conveyance; and improved dispersion in the melt of the coated plastics material on thermal forming.

The following examples serve to illustrate the subject of the invention, without this however being limited by these examples. The term 'parts' denotes parts by weight.

EXAMPLE 1

In a dynomill (Dynomühle) of the type KDL (firm Bachofen, Basle), 300 parts of carbon black (Printex 300) are ground by means of siliquartzite beads 2 mm in diameter in 700 parts of cyclohexanone, with the addition of 3 parts of ethylcellulose (Ethocel N 7, Dow Chem. Corp.), for 6 hours until the particles of the dispersion have a maximum size of 1 micron. Into the very fluid but stable, non-settling dispersion are then stirred 97 parts of Ethocel N 7 and 100 parts of a hydrogenated colophonium ester (Staybelite-ester 10, Hercules Comp.). The result is a pourable paste which is extraordinarily stable in storage.

100 Parts of this paste are well stirred with 1250 parts of polyethylene glycol terephthalate granules until the paste has been distributed homogeneously over the granules. An addition is then slowly made, with stirring, of 100 parts of water, until the paste has quantitatively settled on the granules, and the whole diluted with a further 400 parts of water; the liquid is poured off and the granules washed twice with 500 parts of water; the liquid is collected for regeneration of the cyclohexanone by distillation, and the granules are dried in a stream of air at 100°.

After further drying in high vacuum, these coated granules (granulates) are spun by melt spinning into fibres dyed a fast deep black.

If, instead of polyethylene glycol terephthalate granulates, those made from polyamide 6 or polyamide 6.6 are used, with otherwise the same procedure, then likewise there are obtained fibres deeply dyed a full black.

If, instead of 100 parts of the above-mentioned paste, only 25 parts are used, then the resulting fibres are homogeneously and evenly dyed in a grey shade.

If cyclohexanone is replaced by pentoxone, cellosolve acetate, hexyl glycol or phenyl glycol, then likewise similarly good preparations are obtained.

EXAMPLE 2

The grinding procedure described in Example 1 is repeated, and thickening subsequently performed with 97 parts of Ethocel N 7 and 100 parts of Staybelite ester 3. A similarly good product is obtained. If 150 parts of Staybelite ester 10 and 50 parts of a soluble polyester (Reoplex GL), are used, then the result is an equally good preparation. If, with account being taken of the pigment concentration, the above-mentioned carbon black is replaced by the following organic pigments, the procedure otherwise being as described, then similarly good preparations are obtained, which are suitable for the coating of both polyester granulates and polyamide granulates.

1.

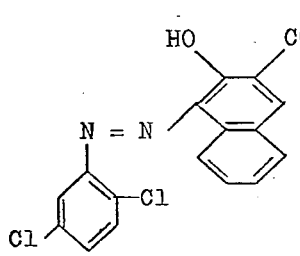
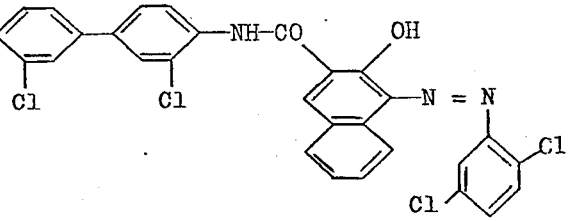

Paste: 10% pigment
Shade: yellow

3.

Paste: 25% pigment
Shade: yellow-red (on polyester)

4. Copper phthalocyanine ($\beta$-crystal modification)
Paste: 20% pigment
Shade: blue 5. Chlorinated copper phthalocyanine
Paste: 20% pigment
Shade: green

EXAMPLE 3

100 Parts of carbon black (Printex 300) are kneaded with 100 parts of Staybelite ester 10, 100 parts of diacetone alcohol and 400 parts of sodium chloride in a trough kneader for 20 hours. Water is then added: salt and solvent are washed out and the press cake flushed with 400 parts of cyclohexanone containing dissolved 5 parts of Ethocel N 7. After removal of the expelled water, the result is a soft pourable paste. This can be used as described in Example 1 for the coating of polyester granulates or polyamide granulates.

EXAMPLE 4

300 Parts of 1,5-dibenzoylaminoanthraquinone are

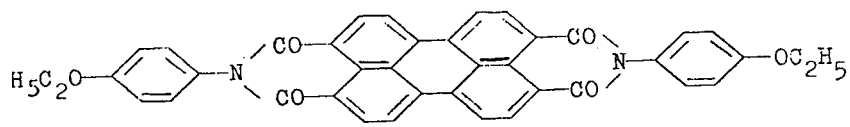

Paste: 20% pigment
Shade: red

2.

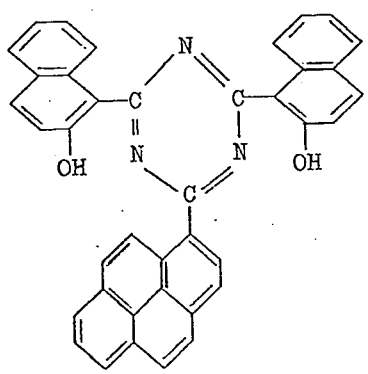

ground in a Dynomuhle KDL (dynomill) in a solution of 2 parts of Ethocel N 7 in 698 parts of cyclohexanone until the particle size is ca. 1–2 microns. 50 Parts of Ethocel N 7 and 50 parts of Escorez 6012 (Esso) are then stirred in to obtain a stable paste which, coated on polyester granulates, produces a fast yellow. If the Escorez 6012 is replaced by identical parts of ethylhydroxyethylcellulose or by Emerez 1538 (Unilever) or by polystyrene, then similarly good preparations are obtained. If identical parts of thioindigo or tetrachlorothioindigo are used, then preparations are obtained which give very brilliant red and violet shades, respectively.

EXAMPLE 5

40 Parts of the amine D salt (Hercules Comp.) of the dyestuff of the formula

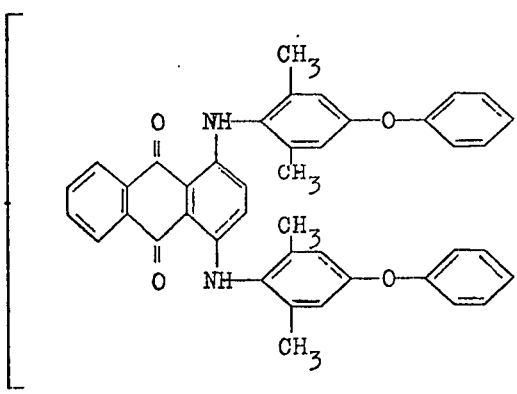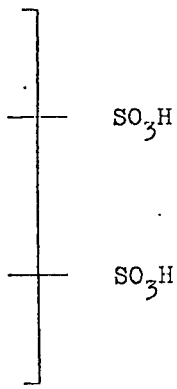

are stirred with 10 parts of Reoplex GL (Ciba-Geigy, UK) and 50 parts of cyclohexanone in a toothed disc mill to obtain a homogeneous paste.

Instead of the amine D salt (Amin-D-Salz), it is also possible to use the salts of Primen JMT or 81 R (Hercules). And Staybelite Ester 1 can be used in place of Reoplex GL. An amount of 10 parts of this paste is diluted with 5 parts of cyclohexanone, and the whole intimately mixed with 400 parts of polyamide 6.6 granules, with the addition of 15 parts of water. An addition of 100 parts of water is made; the liquid is decanted and the procedure repeated four times. The granules are dried and then spun by means of melt spinning into fibres dyed a fast brilliant blue.

If the amine D salt of the dyestuff of the formula

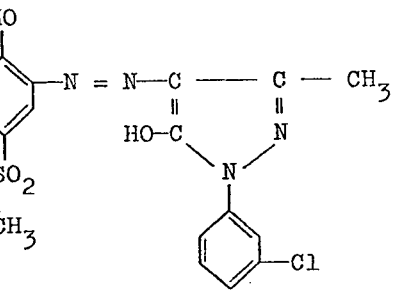

1:2 chrome complex is used, then an equally good preparation giving orange dyeings is obtained. If the amine D salt of the dyestuff of the formula

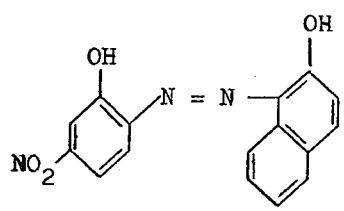

1:2 chrome complex is used, then a preparation giving grey to black dyeings is obtained.

EXAMPLE 6

150 Parts of chlorinated copper phthalocyanine and 150 parts of magnesium behenate are ground in 600 parts of cyclohexanone in a glass-ball mill until the particle size is essentially below 1 micron. The balls are removed, and 75 parts of a liquid polyester (Reoplex GL) and 25 parts of cyclohexanone are stirred in: the result is a stable and pourable paste.

100 Parts of this paste are intimately mixed with 1500 parts of polypropylene granules, with the addition of 100 parts of water. The whole is diluted with water to 500 parts; the liquid is decanted, rinsing is repeated twice and the granules then dried in vacuo. After being spun, these give fibres dyed a fast homogeneous green and possessing the same properties as undyed fibres.

If polypropylene is used in the form of flakes or powder instead of in the form of granulates, with otherwise the same procedure, then similarly good results are obtained.

EXAMPLE 7

200 Parts of chlorinated copper phthalocyanine are ground in 800 parts of cyclohexanone in a Dynomuhle (dynomill) until the particle size of the dispersion is under 1 micron. A solution of 200 parts of ethylhydroxyethylcellulose in 800 parts of cyclohexanone is then stirred in to obtain a stable and pourable paste.

100 Parts of this paste are intimately mixed with 1000 parts of polyester granules and 100 parts of water. The whole is diluted with water to 500 parts: the liquid is decanted and rinsing then repeated twice. Spun by melt spinning, the dried granules produce fibres dyed in a homogeneous green shade. If 20 parts of ethylcellulose and 180 parts of Escorez 6012 (Esso) or 180 parts of Emerez 1538 (Unilever) are stirred into the aforementioned 20% pigment paste, then equally good preparations are obtained.

EXAMPLE 8

2 Parts of the optical brightener of the formula

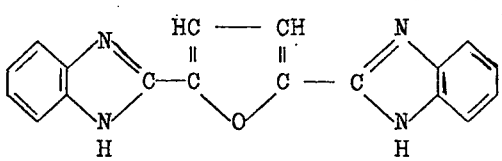

are ground, with the addition of 1 part of ethylcellulose in 7 parts of cyclohexanone.

The paste is coated on 200 parts of polyamide 6 granules in the manner described in Example 1. These are subsequently spun together with 3800 parts of untreated granules. The resulting fibres display a particularly clear pure white.

We claim:

1. A process for coloring polyester or polyamide material, comprising the step of coating polyester or polyamide granulates, flakes or powders with a composition comprising:
    a. at least 35% of a solvent having a boiling point above 90°C, a flash point above 20°C, a water-solubiligy of 1 to 35%, and which is selected from the group consisting of alcohols, esters, ethers and ketones;
    b. 10–40% of a dyestuff or optical brightener which is difficultly soluble or insoluble in water, which contains no dispersing agent and which is dissolved or dispersed as fine particles in said solvent; and
    c. 5–25% of a resin dissolved in said solvent, wherein said resin is chemically stable in the presence of molten polyamide or polyester material and is selected from the group consisting of cellulose ethers and hydrogenated colophonium esters.
2. The process of claim 1, wherein component (b) is a pigment.
3. The process of claim 1, wherein component (a) is 50–70% of solvent, component (b) is 15–25% of carbon black or a phthalocyanine pigment, and component (c) is 15–25% of resin.
4. The process of claim 1, wherein the resin is a cellulose ether selected from the group consisting of ethylcellulose and ethylhydroxyethyl cellulose.
5. The process of claim 3, wherein the resin is a cellulose ether selected from the group consisting of ethylcellulose and ethylhydroxyethyl cellulose.
6. The process of claim 1, wherein the solvent has a boiling point above 150°C and a flash point above 40°C.
7. The process of claim 1, wherein the solvent is a ketone or an ether.
8. The process of claim 7, wherein the solvent is selected from the group consisting of cyclohexanone, 4-methoxy-4-methylphentanone-2, cellosolve acetate, and hexyl glycol.
9. The process of claim 1, comprising the further steps of melting the coated polyester or polyamide material and spinning the melt.
10. Polyester or polyamide material colored by the process of claim 1.
11. Polyester or polyamide material colored by the process of claim 9.

* * * * *